United States Patent [19]

Hund et al.

[11] 4,140,538
[45] Feb. 20, 1979

[54] IRON OXIDE-BASED ANTI-CORROSION PIGMENTS

[75] Inventors: Franz Hund; Günter Linde; Peter Kresse, all of Krefeld, Fed. Rep. of Germany

[73] Assignee: Bayer Aktiengesellschaft, Leverkusen, Fed. Rep. of Germany

[21] Appl. No.: 713,480

[22] Filed: Aug. 11, 1976

[30] Foreign Application Priority Data

Aug. 23, 1975 [DE] Fed. Rep. of Germany ....... 2537684

[51] Int. Cl.² ............................................. C04B 31/02
[52] U.S. Cl. ............................... 106/304; 106/288 B; 106/296; 106/302; 106/14.05
[58] Field of Search ..................... 106/288 B, 296, 302, 106/304, 14.05

[56] References Cited

U.S. PATENT DOCUMENTS 2,502,130   3/1950   Downs et al. ....................... 423/430

*Primary Examiner*—L. Dewayne Rutledge
*Assistant Examiner*—John P. Sheehan
*Attorney, Agent, or Firm*—Sprung, Felfe, Horn, Lynch & Kramer

[57] ABSTRACT

An anti-corrosion pigment comprising about 30 to 70 mole % of an oxide of at least one metal selected from the group consisting of magnesium, calcium and zinc, about 70 to 30 mole % of $Fe_2O_3$, and up to about 20 mole % of $Cr_2O_3$, the pigment having a specific surface of about 1 to 30 m²/g and exhibiting a weight loss of less than about 0.05% per gram of pigment by the Thomson corrosion test, is produced by calcining the corresponding metal oxides. The temperature is about 200 to 650° C. in the absence of chromium and about 200 to 900° C. when chromium is present.

13 Claims, No Drawings

IRON OXIDE-BASED ANTI-CORROSION PIGMENTS

Active anti-corrosion pigments, to which considerable practical significance is attached, are red lead, zinc potassium chromate and zinc dust. In comparison with the iron oxide pigments which are used in large quantities but which have substantially no corrosion preventive action, the aforementioned active anti-corrosion pigments have either a much higher specific gravity or are considerably more expensive. There has been no shortage of attempts to produce active anti-corrosion pigments on the basis of the inexpensive iron oxide starting materials of relatively low specific gravity. Thus, attempts have already been made to produce new anti-corrosion pigments based on iron oxide by calcining zinc and alkaline earth metal oxides, hydroxides and carbonates together with a variety of different iron compounds (oxide, oxide hydroxide, carbonate and sulfate etc.) at temperatures in the range from 650° to 1150° C. However, tests to determine the corrosion-inhibiting effect of pigments such as these have shown that, although they produce a slight improvement by comparison with standard commercial-grade iron oxide pigments, they do not even remotely approach the active anti-corrosion pigments referred to hereinabove.

The object of the present invention is to develop active anti-corrosion pigments based on iron oxide which are equivalent in their corrosion-inhibiting effect to the known active anti-corrosion pigments, but do not have any of their disadvantages.

This object is realized in accordance with the present invention pursuant to which there is provided an anti-corrosion pigment comprising about 30 to 70 mole % of magnesium, calcium and zinc and/or $Fe_2O_3$ and up to about 20 mole %, preferably about 0.1 to 10 and more preferably about 0.2 to 5 mole %, or $Cr_2O_3$, the pigment having a specific surface of about 1 to 30 $m^2/g$ and exhibiting a weight loss of less than about 0.05% and preferably less than about 0.03% per gram of pigment by the Thomson corrosion test.

The present invention also provides a process for the production of such anti-corrosion pigments by calcining the corresponding metal oxides or starting materials which yield metal oxides during calcination, wherein, in the case of chromium-free pigments, calcination is carried out at temperatures of about 200° to 650° C., preferably at temperatures of about 300° to 600° C. and, with particular preference, at temperatures of about 400° to 600° C., and in the case of chromium-containing pigments at temperatures of about 200° to 900° C., preferably at temperatures of about 250° to 800° C. and, with particular preference, at temperatures of about 300° to 650° C., in the presence of an oxygen-containing and/or an inert gas.

The present invention also relates to the use of the pigments according to the invention and produced in accordance with the invention for the production of rust-proofing paints based on anti-corrosion coatings or anti-corrosion lacquers, the pigments being incorporated in known fashion and amount into conventional paint vehicles.

The new active anti-corrosion pigments based on iron oxide are produced by preparing intimate mixtures which yield MeO on calcination, and of about 70 to 30 mole % of $Me_2O_3$ (Me = Fe, Cr, the maximum chromium content being about 20 mole %) or compounds which yield $Me_2O_3$ on calcination, calcining the resulting mixture in a certain temperature range, intensively grinding the product of calcination and optionally subjecting it to calcination once again, followed by cooling and grinding.

The calcination temperature has a critical effect on the properties of the anti-corrosion pigments obtained. The calcination time is generally between 0.1 and 20 hours and preferably between about 0.5 and 10 hours. The anti-corrosion pigments according to the invention have specific surfaces according to BET (G. Brunauer, P. H. Emmet and H. Teller, J. Amer Chem. Soc. 60, 309 (1938), of about 1 to 30 $m^2/g$ and preferably about 1 to 15 $m^2/g$.

After the Thomson corrosion test (H. A. Gardener, Physical and Chemical Examinations of Paints, Varnishes, Lacquers and Colors, 11th Edition, Bethesda 1950, page 399), the anti-corrosion pigments according to the invention show percentage losses per gram of pigment of less than about 0.05% per gram of anti-corrosion pigment and preferably less than about 0.03% per gram of anti-corrosion pigment. By way of comparison, an anti-corrosion pigment based on $Pb_3O_4$ subjected to the Thomson corrosion test shows a percentage loss per gram of $Pb_3O_4$ of the order of 0.06%, whereas an active zinc oxide subjected to the Thomson test shows a percentage loss per gram of zinc oxide of as much as 0.08%.

Starting compounds (MeO) suitable for use in the production of the anti-corrosion pigments according to the invention are the divalent oxides of the elements magnesium calcium and zinc or compounds which yield them on calcination, such as hydroxides, hydroxy salts, carbonates, basic carbonates, nitrates, chlorides, sulfates, formates, acetates oxalates and other organic compounds of these divalent metals. Suitable $Fe_2O_3$ starting compounds are only iron oxides or compounds which produce trivalent iron oxide on calcination such as oxide hydroxide, hydroxides, hydroxy salts, carbonates basic carbonates, nitrates, chlorides, sulfates, formates, acetates and oxalates. In cases where iron compounds which do not contain the iron in trivalent form are used, calcination of the anti-corrosion pigments according to the invention has to be carried out in an oxygen-containing atmosphere, preferably in air or in oxygen-enriched air. Among the iron compounds, it has proved to be of particular advantage to use $Fe(OH)_2$, $FeCO_3$ or basic carbonate which may be obtained by precipitating an alkali metal or an alkaline earth metal hydroxide or carbonate from iron(II) salts, preferably iron(II) sulfate solutions.

Other commercially interesting starting materials for iron(III) oxide are the $Fe_3O_4$-, $\alpha$-FeOOH- and $\alpha$-$Fe_2O_3$-pigment sludges which accumulate during the reduction of aromatic nitro compounds with iron in acid solution, or the iron oxide yellow-($\alpha$-FeOOH), iron oxide orange-($\gamma$-FeOOH) and iron oxide red-($\alpha$-$Fe_2O_3$) pigments which can be obtained by the air oxidation process with iron scrap or by precipitating $Fe(OH)_2$ in the presence of seeds. The red, brown and black iron oxides formed from iron(II) sulfate optionally containing water of crystallization, by roasting oxidation or roasting reduction processes, are also suitable starting compounds for the production of the new active anti-corrosion pigments.

Suitable chromium compounds are the trivalent oxides or oxide hydrates themselves or the crystalline or amorphous compounds which yield them on calcination, such as hydroxides oxide hydroxides, oxide aquates, basic carbonates, nitrates chlorides, sulfates, formates, acetates, oxalates, etc. It is preferred to use $Cr_2O_3$ itself.

In one special embodiment, chromate(VI) or dichromate compounds, for example sodium chromate or sodium dichromate, are reacted with iron(II) salts in suitable quantities to reduce the Cr(VI) to Cr(III) and, at the same time, to oxidize Fe(II) to Fe(III), a mixed precipitate of chromium(III) and iron(III) oxide aquate being formed. This mixed precipitate is an eminently suitable starting material for the production of the anti-corrosion pigments according to the invention.

Another possible method of preparing the oxidic starting materials for the new anti-corrosion pigments is to coprecipitate either completely or in part Me(II)- and Me(III)- salt solutions (Me(II) = Mg, Ca, Zn, Fe; Me(III) = Fe, Cr) with an alkali metal or an alkaline earth metal hydroxide or carbonate.

Tables 1 to 3 below show the properties of various anti-corrosion pigments according to the invention in dependence both upon their composition and the calcination temperature. The anti-corrosion pigments were obtained by preparing intimate mixtures of 30 to 70 mole % of MeO(Me(II) = Mg, Ca, Zn) and 70 to 30 mole % of $Me_2O_3$ (Me(III) = Fe, Cr) heating the resulting mixture for 30 minutes to a temperature 100° C. below the temperature indicated in Tables 1 to 3, intensively grinding the product of calcination and calcining it again for 30 minutes at the final temperatures shown in the Tables, followed by cooling and grinding. The absolute quantities of the calcines varied from 50 to 100 g. The specific surfaces of all the pigments were about 10 $m^2/g$. The results of the pigment tests (30 g of pigment) are shown separately according to the systems MgO . (Fe, Cr)$_2$O$_3$ (Table 1), CaO . (Fe, Cr)$_2$O$_3$ (Table 2) and ZnO . (Fe, Cr)$_2$O$_3$ (Table 3) in dependence upon the $Cr_2O_3$ content and the final calcination temperature. The Tables show the considerable improvement in corrosion-inhibiting effect of the pigments when part of the iron(III) oxide is replaced by chromium(III) oxide, and also how the calcination temperature can be increased with increasing proportion of $Cr_2O_3$ without any adverse effect upon the good quality of the new active anti-corrosion pigments.

The Thomson corrosion test on the pigments was carried out as follows:

15 or 30 g of pigment (according to apparent density), 60 ml of doubled distilled water and 4 cleaned and polished razor-blades, which had been degreased with ether, weighed and tied with nylon-6 threads, were introduced into a 200 ml capacity powder bottle provided with a double-bore stopper. The individual powder bottles arranged in a row one behind the other were connected by glass tubes to the various pigment suspensions with empty powder bottles in between. By switching on the laboratory vacuum, a uniform airstream of 60 l/h was passed through for 20 days by way of an air rotameter and an Erlenmeyer flask acting as a bubble counter. Under the effect of the air stream, the pigment suspension was kept in a state of constant motion so that the pigment is in permanent contact with the water. After 20 days, the razor blades were removed from each bottle, carefully cleaned, dried and the weight loss determined by reweighing. The percentage weight loss is divided by the quantity of pigment used. The percentage loss/g of pigment is a measure of the intensity of corrosion. The lower this value, the greater is the corrosion-inhibiting effect of the pigment. Since the values thus determined are extremely small, they were multiplied by a factor of $10^3$ in order to make them easier to compare. These values are shown in the last column of Tables 1 to 3.

The corrosion behavior of a few inorganic pigments in the Thomson corrosion test is shown in Table 4 for comparison with the anti-corrosion pigments according to the invention.

Table 1:

Corrosion behavior of some MgO— and (Fe, Cr)$_2$O$_3$-containing pigments in dependence upon the calcination temperature (30 g of pigment/60 ml of $H_2O$)

| Test No. | Composition in mole % | | | Calcination temperature ½ h - °C | $10^3 \times$ % - loss/g of pigment |
|---|---|---|---|---|---|
| | MgO | Fe$_2$O$_3$ | Cr$_2$O$_3$ | | |
| 1.1 | 50.0 | 50.0 | — | 300 | 55.9 |
| 1.2 | 50.0 | 50.0 | — | 400 | 7.1 |
| 1.3 | 50.0 | 50.0 | — | 500 | 8.8 |
| 1.4 | 50.0 | 50.0 | — | 600 | 8.6 |
| 1.5 | 50.0 | 50.0 | — | 700 | 18.3 |
| 1.6 | 50.0 | 50.0 | — | 800 | 26.1 |
| 1.7 | 50.0 | 49.3 | 0.7 | 300 | 0.30 |
| 1.8 | 50.0 | 49.3 | 0.7 | 400 | 0.00 |
| 1.9 | 50.0 | 49.3 | 0.7 | 500 | 0.15 |
| 1.10 | 50.0 | 49.3 | 0.7 | 600 | 3.44 |
| 1.11 | 50.0 | 49.3 | 0.7 | 700 | 6.20 |
| 1.12 | 50.0 | 48.7 | 1.3 | 300 | 0.00 |
| 1.13 | 50.0 | 48.7 | 1.3 | 400 | 0.00 |
| 1.14 | 50.0 | 48.7 | 1.3 | 500 | 0.00 |
| 1.15 | 50.0 | 48.7 | 1.3 | 600 | 1.35 |
| 1.16 | 50.0 | 48.7 | 1.3 | 700 | 3.44 |
| 1.17 | 50.0 | 48.7 | 1.3 | 800 | 4.92 |
| 1.18 | 50.0 | 47.1 | 2.9 | 300 | 0.87 |
| 1.19 | 50.0 | 47.1 | 2.9 | 400 | 0.58 |
| 1.20 | 50.0 | 47.1 | 2.9 | 500 | 0.00 |
| 1.21 | 50.0 | 47.1 | 2.9 | 600 | 0.00 |
| 1.22 | 50.0 | 47.1 | 2.9 | 700 | 0.00 |
| 1.23 | 50.0 | 47.1 | 2.9 | 800 | 4.07 |
| 1.24 | 50.0 | 44.2 | 5.8 | 300 | 0.15 |
| 1.25 | 50.0 | 44.2 | 5.8 | 400 | 0.00 |
| 1.26 | 50.0 | 44.2 | 5.8 | 500 | 0.00 |
| 1.27 | 50.0 | 44.2 | 5.8 | 600 | 0.44 |
| 1.28 | 50.0 | 44.2 | 5.8 | 700 | 0.15 |
| 1.29 | 50.0 | 44.2 | 5.8 | 800 | 4.65 |
| 1.30 | 50.0 | 41.0 | 9.0 | 300 | 1.90 |
| 1.31 | 50.0 | 41.0 | 9.0 | 400 | 0.29 |
| 1.32 | 50.0 | 41.0 | 9.0 | 500 | 0.72 |
| 1.33 | 50.0 | 41.0 | 9.0 | 600 | 0.00 |
| 1.34 | 50.0 | 41.0 | 9.0 | 700 | 0.29 |
| 1.35 | 50.0 | 41.0 | 9.0 | 800 | 1.60 |

Table 2:

Corrosion behavior of some CaO— and (Fe, Cr)$_2$O$_3$-containing pigments in dependence upon the calcination temperature (30 g of pigment/60 ml of $H_2O$)

| Test No. | Composition in mole % | | | Calcination temperature ½ h - °C | $10^3 \times$ %- loss/g of pigment |
|---|---|---|---|---|---|
| | CaO | Fe$_2$O$_3$ | Cr$_2$O$_3$ | | |
| 2.1 | 50.0 | 50.0 | — | 500 | 5.1 |
| 2.2 | 50.0 | 50.0 | — | 600 | 3.4 |
| 2.3 | 50.0 | 50.0 | — | 700 | 5.1 |
| 2.4 | 50.0 | 50.0 | — | 800 | 7.2 |
| 2.5 | 50.0 | 49.1 | 0.9 | 500 | 0.00 |
| 2.6 | 50.0 | 49.1 | 0.9 | 550 | 0.00 |
| 2.7 | 50.0 | 49.1 | 0.9 | 600 | 0.00 |
| 2.8 | 50.0 | 49.1 | 0.9 | 650 | 0.00 |
| 2.9 | 50.0 | 49.1 | 0.9 | 700 | 0.30 |
| 2.10 | 50.0 | 49.1 | 0.9 | 750 | 0.45 |
| 2.11 | 50.0 | 49.1 | 0.9 | 800 | 2.72 |
| 2.12 | 50.0 | 48.3 | 1.7 | 500 | 0.00 |
| 2.13 | 50.0 | 48.3 | 1.7 | 600 | 0.00 |
| 2.14 | 50.0 | 48.3 | 1.7 | 700 | 0.00 |
| 2.15 | 50.0 | 48.3 | 1.7 | 750 | 0.00 |
| 2.16 | 50.0 | 48.3 | 1.7 | 800 | 0.00 |
| 2.17 | 50.0 | 48.3 | 1.7 | 850 | 0.30 |
| 2.18 | 50.0 | 47.4 | 2.6 | 500 | 0.15 |
| 2.19 | 50.0 | 47.4 | 2.6 | 550 | 0.15 |
| 2.20 | 50.0 | 47.4 | 2.6 | 600 | 0.14 |
| 2.21 | 50.0 | 47.4 | 2.6 | 650 | 0.00 |
| 2.22 | 50.0 | 47.4 | 2.6 | 700 | 0.29 |
| 2.23 | 50.0 | 47.4 | 2.6 | 750 | 0.15 |
| 2.24 | 50.0 | 47.4 | 2.6 | 800 | 0.58 |
| 2.25 | 50.0 | 47.4 | 2.6 | 850 | 0.43 |
| 2.26 | 50.0 | 43.9 | 6.1 | 500 | 1.94 |

Table 2:-continued

Corrosion behavior of some CaO— and (Fe, Cr)$_2$O$_3$-containing pigments in dependence upon the calcination temperature (30 g of pigment/60 ml of H$_2$O)

| Test No. | Composition in mole % CaO | Fe$_2$O$_3$ | Cr$_2$O$_3$ | Calcination temperature ½ h - °C | 10$^3$ × %-loss/g of pigment |
|---|---|---|---|---|---|
| 2.27 | 50.0 | 43.9 | 6.1 | 600 | 1.82 |
| 2.28 | 50.0 | 43.9 | 6.1 | 700 | 2.10 |
| 2.29 | 50.0 | 43.9 | 6.1 | 800 | 6.88 |
| 2.30 | 50.0 | 37.7 | 12.3 | 500 | 0.43 |
| 2.31 | 50.0 | 37.7 | 12.3 | 600 | 0.00 |
| 2.32 | 50.0 | 37.7 | 12.3 | 650 | 0.00 |
| 2.33 | 50.0 | 37.7 | 12.3 | 700 | 0.70 |
| 2.34 | 50.0 | 37.7 | 12.3 | 750 | 1.45 |

Table 3:

Corrosion behavior of some ZnO— and (Fe, Cr)$_2$O$_3$-containing pigments in dependence upon the calcination temperature (30 g of pigment/60 ml of H$_2$O)

| Test No. | Composition in mole % ZnO | Fe$_2$O$_3$ | Cr$_2$O$_3$ | Calcination temperature ½ h - °C | 10$^3$ × %-loss/g of pigment |
|---|---|---|---|---|---|
| 3.1 | 50.0 | 50.0 | — | 250 | 71.0 |
| 3.2 | 50.0 | 50.0 | — | 300 | 53.4 |
| 3.3 | 50.0 | 50.0 | — | 400 | 30.0 |
| 3.4 | 50.0 | 50.0 | — | 500 | 32.6 |
| 3.5 | 50.0 | 50.0 | — | 600 | 33.4 |
| 3.6 | 50.0 | 50.0 | — | 700 | 38.6 |
| 3.7 | 50.0 | 48.7 | 1.3 | 250 | 1.49 |
| 3.8 | 50.0 | 48.7 | 1.3 | 300 | 0.30 |
| 3.9 | 50.0 | 48.7 | 1.3 | 400 | 0.00 |
| 3.10 | 50.0 | 48.7 | 1.3 | 500 | 0.90 |
| 3.11 | 50.0 | 48.7 | 1.3 | 600 | 3.14 |
| 3.12 | 50.0 | 48.7 | 1.3 | 700 | 18.36 |
| 3.13 | 50.0 | 47.3 | 2.7 | 250 | 10.66 |
| 3.14 | 50.0 | 47.3 | 2.7 | 300 | 0.00 |
| 3.15 | 50.0 | 47.3 | 2.7 | 400 | 0.00 |
| 3.16 | 50.0 | 47.3 | 2.7 | 500 | 0.00 |
| 3.17 | 50.0 | 47.3 | 2.7 | 600 | 14.11 |
| 3.18 | 50.0 | 47.3 | 2.7 | 700 | 25.79 |
| 3.19 | 50.0 | 44.1 | 5.9 | 300 | 3.44 |
| 3.20 | 50.0 | 44.1 | 5.9 | 400 | 0.00 |
| 3.21 | 50.0 | 44.1 | 5.9 | 500 | 0.00 |
| 3.22 | 50.0 | 44.1 | 5.9 | 600 | 1.63 |
| 3.23 | 60.0 | 44.1 | 5.9 | 700 | 3.91 |
| 3.24 | 50.0 | 38.3 | 11.7 | 250 | 7.32 |
| 3.25 | 50.0 | 38.3 | 11.7 | 300 | 6.53 |
| 3.26 | 50.0 | 38.3 | 11.7 | 400 | 0.00 |
| 3.27 | 50.0 | 38.3 | 11.7 | 500 | 0.15 |
| 3.28 | 50.0 | 38.3 | 11.7 | 600 | 1.74 |
| 3.29 | 50.0 | 38.3 | 11.7 | 700 | 5.51 |
| 3.30 | 50.0 | 31.9 | 18.1 | 250 | 11.79 |
| 3.31 | 50.0 | 31.9 | 18.1 | 300 | 1.31 |
| 3.32 | 50.0 | 31.9 | 18.1 | 400 | 0.00 |
| 3.33 | 50.0 | 31.9 | 18.1 | 500 | 0.00 |
| 3.34 | 50.0 | 31.9 | 18.1 | 600 | 1.61 |
| 3.35 | 50.0 | 31.9 | 18.1 | 700 | 6.15 |

Table 4:

Corrosion behavior of some inorganic pigments in the Thomson test

| Test No. | Type of pigment | g pigment 60 ml H$_2$O | Loss (%) | 10$^3$ × %-loss/g of pigment |
|---|---|---|---|---|
| 4.1 | α-FeOOH | 15 | 10.10 | 673.0 |
| 4.2 | α-Fe$_2$O$_3$ | 30 | 5.05 | 168.0 |
| 4.3 | Fe$_3$O$_4$ | 30 | 10.36 | 345.0 |
| 4.4 | γ-CrOOH | 15 | 1.69 | 113.0 |
| 4.5 | Pb$_3$O$_4$ | 30 | 1.73 | 57.7 |
| 4.6 | ZnO | 15 | 1.20 | 80.4 |

It will be appreciated that the instant specification and examples are set forth by way of illustration and not limitation, and that various modifications and changes may be made without departing from the spirit and scope of the present invention.

What is claimed is:

1. A process for the production of an anti-corrosion pigment, comprising about 30 to 70 mole % of an oxide of at least one metal selected from the group consisting of magnesium, calcium and zinc, about 70 to 30 mole % of Fe$_2$O$_3$, and about 0.1 to 20 mole % of Cr$_2$O$_3$, which comprises calcining the corresponding metal oxides or starting materials which yield metal oxides upon calcination at a temperature of about 200° to 900° C.

2. A process as claimed in claim 1, wherein calcination is effected at about 250° to 800° C.

3. A process as claimed in claim 1, wherein calcination is effected at about 300° to 650° C.

4. A process as claimed in claim 1, wherein the metal selected from the group consisting of magnesium, calcium, and zinc is initially present as a hydroxide, hydroxy salt, carbonate, basic carbonate, nitrate, chloride, sulfate, formate, acetate or oxalate.

5. A process as claimed in claim 1 wherein the iron is initially present as an Fe(II) oxide, hydroxide, hydroxy salt, carbonate, basic carbonate, nitrate, chloride, sulfate, formate, acetate or oxalate and calcination is carried out in the presence of an oxygen-containing gas.

6. A process as claimed in claim 1, wherein the iron is initially present as a Fe(III) alpha-, betha-, or gamma-oxide, alpha-, betha-, gamma- or delta-oxide hydroxide, amorphous hydroxide, sulfate, nitrate, chloride, formate, oxalate or acetate.

7. A process as claimed in claim 1, wherein the chromium is initially present as a Cr(III) oxide aquate or amorphous hydroxide.

8. A process as claimed in claim 1, wherein a mixed hydroxide or oxide hydroxide of Fe(III) and Cr(III) is included in the material being calcined.

9. An anti-corrosion pigment produced by the process of claim 1, the pigment having a specific surface of about 1 to 30 m$^2$/g and exhibiting a weight loss of less than about 0.05% per gram of pigment by the Thomson corrosion test.

10. A pigment according to claim 9 containing about 0.1 to 10 mole % of Cr$_2$O$_3$.

11. A pigment according to claim 9 containing about 0.2 to 5 mole % of Cr$_2$O$_3$ and exhibiting a Thomson corrosion test weight loss of less than about 0.03% per gram of pigment.

12. A pigment according to claim 9 comprising about 30 to 70 mole % of magnesium oxide.

13. A pigment according to claim 9 comprising about 30 to 70 mole % of zinc oxide.

* * * * *